US006883634B2

United States Patent
Toyokawa et al.

(10) Patent No.: US 6,883,634 B2
(45) Date of Patent: Apr. 26, 2005

(54) TRACTOR (75) Inventors: Mitsuo Toyokawa, Iyo-gun (JP); Renshi Goto, Iyo-gun (JP); Shoji Komoda, Iyo-gun (JP); Yuji Yoshizawa, Iyo-gun (JP); Junichi Oshita, Iyo-gun (JP)

(73) Assignee: Iseki & Co., Ltd., Matsuyama (JP)

( * ) Notice: Subject to any disclaimer, the term of this patent is extended or adjusted under 35 U.S.C. 154(b) by 127 days.

(21) Appl. No.: 10/279,193

(22) Filed: Oct. 23, 2002

(65) Prior Publication Data
US 2003/0079452 A1 May 1, 2003

(30) Foreign Application Priority Data

Oct. 25, 2001 (JP) ........................................ 2001-327623
Nov. 16, 2001 (JP) ........................................ 2001-351430

(51) Int. Cl.$^7$ .............................................. B60K 17/22
(52) U.S. Cl. ........................ 180/374; 180/245; 180/383
(58) Field of Search ................................ 180/337, 374, 180/383, 245, 53.4, 242; 56/10.8, 10.9, 14.7

(56) References Cited

U.S. PATENT DOCUMENTS

| 4,643,442 | A | * | 2/1987 | Ohashi et al. | ............ | 280/461.1 |
| 4,787,293 | A | * | 11/1988 | Kishizawa et al. | ............ | 91/443 |
| 5,479,845 | A | * | 1/1996 | Kawamura et al. | ............ | 91/514 |
| 5,560,447 | A | * | 10/1996 | Ishii et al. | ................... | 180/242 |
| 5,746,109 | A | * | 5/1998 | Matsuda | ...................... | 91/448 |
| 5,947,218 | A | * | 9/1999 | Ishimaru | ..................... | 180/53.1 |

FOREIGN PATENT DOCUMENTS

| JP | 64-11486 B2 | 2/1989 |
| JP | 9-272350 A | 10/1997 |
| JP | 2000-300034 A | 10/2000 |

* cited by examiner

Primary Examiner—David R. Dunn
(74) Attorney, Agent, or Firm—Edwards & Angell, LLP; David G. Conlin; George W. Hartnell, III (57) ABSTRACT

The present invention provides a tractor 1 constructed so that an engine 2 is mounted on the front portion of a traveling vehicle body having front wheels 19 and rear wheels 11, a transmission case 3 is provided at the rear portion of the traveling vehicle body, an output shaft 2a of the engine 2 and a transmission input shaft 5 provided on the front face of the transmission case 3 are joined to each other by a first universal joint 6, and a work machine 24 is attached between the front and rear wheels 19 and 11 in a manner enabling it to rise and fall, wherein a front wheel traveling input shaft 15 is provided sat the rear portion of the front axle housing 14 that supports the front wheels 19 so as to project rearward to the inclined upper side, and this front wheel traveling input shaft 15 and a front wheel driving shaft 13 projecting from the transmission case 3 are joined to each other by a second universal joint 17. A first universal joint 6 is provided at the horizontal center of the traveling vehicle body in a planar view, the second universal joint 17 is provided so as to deflect horizontally, and the first universal joint 6 is provided higher than the second universal joint 17 when they are viewed from the side, whereby a work machine 24 mounted to the lower portion of the traveling vehicle body can be lifted high from the ground.

8 Claims, 11 Drawing Sheets

TRACTOR

BACKGROUND OF THE INVENTION

1. Field of the Invention

The present invention relates to a tractor for mowing or earthing-up by attaching various work machines to the lower portion of a traveling vehicle body having front wheels and rear wheels.

2. Description of the Related Art

Tractors for mowing by attaching a work machine such as a mower to the lower portion of a traveling vehicle body have been generally known. For example, the tractor disclosed in Japanese Unexamined Patent Publication No. H09-272350 is constructed so that a mower is attached to the lower body portion between the front wheels and rear wheels, the driving force of the engine side is transmitted by a universal joint to the transmission case side, a mid PTO shaft projecting from the front face of the transmission case and an input shaft at the mower side are joined by other universal joints to drive mowing blades, and a front wheel driving shaft that also projects from the front face of the transmission case and a front wheel traveling input shaft provided at the rear portion of the front axle housing are joined by a universal joint so that the front wheels are also driven.

Generally, when a tractor travels across farm fields or roads after finishing mowing, a work machine such as a mower must be lifted high from the ground so as not to obstruct traveling. In the case of the abovementioned conventional tractor, to prevent the driving force transmission shaft for driving front wheels from obstructing lifting of the mower, the driving force transmission shaft is located close to the machine frame and extended forward parallel to the ground, the front end of the driving force transmission shaft is supported on the machine frame side by a special bearing, a transmission case for raising the position of the input shaft is provided at the front axle housing side, and the input shaft of this transmission case side and the front end of the driving force transmission shaft are joined to each other via a separate middle shaft, whereby the front wheels are driven.

Therefore, in this prior art, the structure for driving the front wheels is complicated and a bearing and a transmission case are required, resulting in an increase in the number of parts and manufacturing costs.

SUMMARY OF THE INVENTION

An object of the invention is to provide a tractor which can be constructed at low cost without installation of a special bearing and an extra transmission case, and can lift a work machine such as a mower to a height above the ground.

Another object of the invention is to improve operability of a work machine that is connected to the rear portion of a tractor to carry out tilling.

The invention uses the following technical means.

That is, according to a first aspect of the invention, a tractor comprises a traveling vehicle body having a pair of front wheels 19 and a pair of rear wheels 11, an engine 2 that is mounted to the front portion of said traveling vehicle body and has an output shaft 2a, a transmission case 3 that is disposed at the rear portion of the traveling vehicle body and houses a transmission including an input shaft 5 and a front wheel driving shaft 13, a first universal joint 6 joining the output shaft 2a of the engine 2 and the input shaft 5 of the transmission case 3, a work machine 24 attached between the front wheels 19 and rear wheels 11 so as to enable it to rise and fall, a front axle housing 14 supporting the pair of front wheels 19, a front wheel traveling input shaft 15 projected rearward to the inclined upper side at the rear portion of the front axle housing 14, and a second universal joint 17 joining the front wheel traveling input shaft 15 and a front wheel driving shaft 13 projecting from the transmission case 3.

According to a second aspect of the invention, the abovementioned work machine 24 mounted to the tractor is a mower for mowing.

According to a third aspect of the invention, the tractor according to the first or second aspect of the invention is constructed so that the first universal joint 6 is provided at the horizontal center of the traveling vehicle body in a planar view, the second universal joint 17 is provided so as to deflect horizontally with respect to this first universal joint 6, and the first universal joint 6 is provided higher than the second universal joint 17 when it is viewed from the side.

Action of the abovementioned construction is as follows.

A driving force from the front wheel driving shaft 13 is transmitted to the front wheel traveling input shaft 15 via the second universal joint 17 to drive the front wheels 19 supported by the front axle housing 14.

During work, a rotating drive force is transmitted to the drive part of the work machine (mower 24) from the mid PTO shaft at the transmission case 3 side or the front PTO shaft 21 at the engine front portion to rotate the drive part, and this force lifts the work machine when the tractor travels across a farm field or on a road after finishing the work.

In this case, the rear end of the front wheel traveling input shaft 15 which projects rearward to the inclined upper side from the rear portion of the front axle housing 14 is at a high position from the ground, and this front wheel traveling input shaft 15 and the front wheel driving shaft 13 at the transmission case 3 side are joined by the second universal joint 17. Therefore, the second universal joint 17 itself can be provided at a high position, and is prevented from obstructing lifting of the work machine (mower 24), so that a lifting and lowering space for the work machine can be widely secured between the front wheels 19 and the rear wheels 11.

Particularly, since the second universal joint 17 is provided so as to deflect horizontally, a mower 24 having a gearbox projecting upward on the upper surface of the work machine (mower 24) can be lifted high.

In the construction of the abovementioned Japanese Unexamined Patent Publication No. H09-272350, a mower lifting space is secured while a driving force from the transmission is transmitted to a first middle shaft horizontally disposed, a bearing supported by the traveling frame, the second middle shaft whose the front side hangs down and which is connected to said bearing, a gear mechanism, and then an input shaft for front wheel driving. On the other hand, according to the invention, as mentioned above, in a construction obtained by only joining the front wheel traveling input shaft 15 projecting rearward to the inclined upper side from the rear portion of the front axle housing 14 and one long middle shaft (second universal joint) 17 to each other, a mower lifting space can be secured while a driving force from the transmission 3 is transmitted to the traveling input shaft 15.

The front wheel traveling input shaft 15 is joined by one long middle shaft (second universal joint) 17, and the angle formed by crossing the shafts 15 and 17 with each other become smaller, so that the structure strength is prevented from deteriorating, and a mower lifting space can be secured by a relatively small number of parts (only the second universal joint 17 is used as a middle shaft in place of the first and second middle shafts in the construction of Japanese Unexamined Patent Publication No. H09-272350, and furthermore; no bearing and gear mechanism are used).

DETAILED DESCRIPTION OF THE PREFERRED EMBODIMENTS

Hereinafter, an embodiment of the invention will be described with reference to the accompanying drawings. First, describing the construction, an engine 2 is mounted to the front portion of the body of the tractor 1, and a rotating drive force of this engine 2 is transmitted to a pump shaft 5 of a hydrostatic transmission (HST) mounted to the front portion of a transmission case 3 via a first universal joint 6.

In the case of a tractor that comprises no hydrostatic transmission (HST), the rear end of the first universal joint 6 is directly joined to a transmission input shaft provided at the front portion of the transmission case 3, however, the tractor 1 of the present embodiment includes a hydrostatic transmission (HST) 4 mounted to the front portion of the transmission case 3, so that the first universal joint 6 is joined to the pump shaft 5 of the hydrostatic transmission (HST) 4.

A rotating drive force inputted into the hydrostatic transmission (HST) 4 is controlled so as to control the number of revolutions and the direction of rotation of a motor shaft 10 in accordance with a pressing degree of an HST pedal 9 provided on the right of the floor 8 by changing the inclination angle of the swash plate of HST.

The rotating drive force of the motor shaft 10 is reduced by a sub-transmission inside the transmission case 3, which is not shown, and a part of the force is transmitted to the rear wheel axle 12 via a differential gear to drive the rear wheels 11, and a driving force that diverges in the front of the differential gear is transmitted to the front wheel driving shaft 13. The front wheel driving shaft 13 is provided so as to project forward on the right of the front face of the transmission case 3, and this front wheel driving shaft 13 and the front wheel traveling input shaft 15 pivotally supported on the rear portion of the front axle housing 14 are interlocked and joined to each other via a second universal joint 17 that is longitudinally long to drive the front wheels 19.

More concretely, the front axle housing 14 is supported so as to swing around a center pivot 37 along the longitudinal direction, and to the rear right portion of the front axle housing 14, a holder case 16 to hold the front wheel traveling input shaft 15 is detachably attached.

The holder case 16 is diagonally attached to the front axle housing 14 so that the rear end thereof faces upward in an inclined backward direction, the front wheel traveling input shaft 15 is pivotally supported on this holder case 16, and the front end of the second universal joint 17 is joined to the rear end of this front wheel traveling input shaft 15.

To the rear end of the holder case 16, a cylindrical rubber cover 20 is attached to prevent entry of mud and dust.

Furthermore, at two points of the front and rear lower portions of the transmission case 3, a mid PTO shaft 21 and a rear PTO shaft 22 are respectively laid, and a rotating drive force is transmitted to these via the transmission inside the transmission case 3 and a PTO clutch 23.

The rear PTO shaft 22 is used for driving a work machine such as a rotary tiller (not shown) connected to the rear portion of the tractor 1, and the mid PTO shaft 21 is provided between the front wheels 19 and the rear wheels 11 and used for driving a work machine such as a mower 24 mounted on the lower body portion of the tractor 1.

This mid PTO shaft 21 is provided on the first universal joint 6 at the opposite side (on the left in the traveling direction) of the second universal joint 17 in a planar view.

The mower 24 is connected to the traveling vehicle body by a link mechanism 25 in a manner enabling it to rise and fall, and an input shaft 28 projecting rearward from a gear box 26 of the mower 24 and the mid PTO shaft 21 are interlocked and joined to each other by a third universal joint 29 to rotate a plurality of blades 30 inside the mower 24. The link mechanism 25 for lifting and lowering the mower 24 may be driven by a hydraulic cylinder or an electric motor, however, in this embodiment, a feedback link mechanism 27 is connected to the end of the lift arms 38 to lift and lower the mower 24 in accordance with movements of the lift arm 38.

When the lift arms 38 rotate, the mower 24 rises and falls roughly parallel to the ground. A gear pump 31 is attached to the front portion of the transmission case 3, and a control valve 33 for lifting and lowering the work machine is detachably attached to the upper portion of this gear pump 31. On the other hand, a hydraulic cylinder case 36 housing a single-acting hydraulic cylinder 34 is provided on the upper portion of the transmission case 3, and to both the right and left sides of the hydraulic cylinder case 3, lift arms 38 and 38 are rotatably pivotally attached. The gear pump 31 is always driven via the gear inside the transmission case 3, which is not shown. The gear pump 31 and the bottom of the transmission case 3 are connected via the suction pipe 32 so that hydraulic oil serving also as transmission oil inside the transmission case 3 is suctioned into the gear pump 31 via this suction pipe 32.

Figure 1:
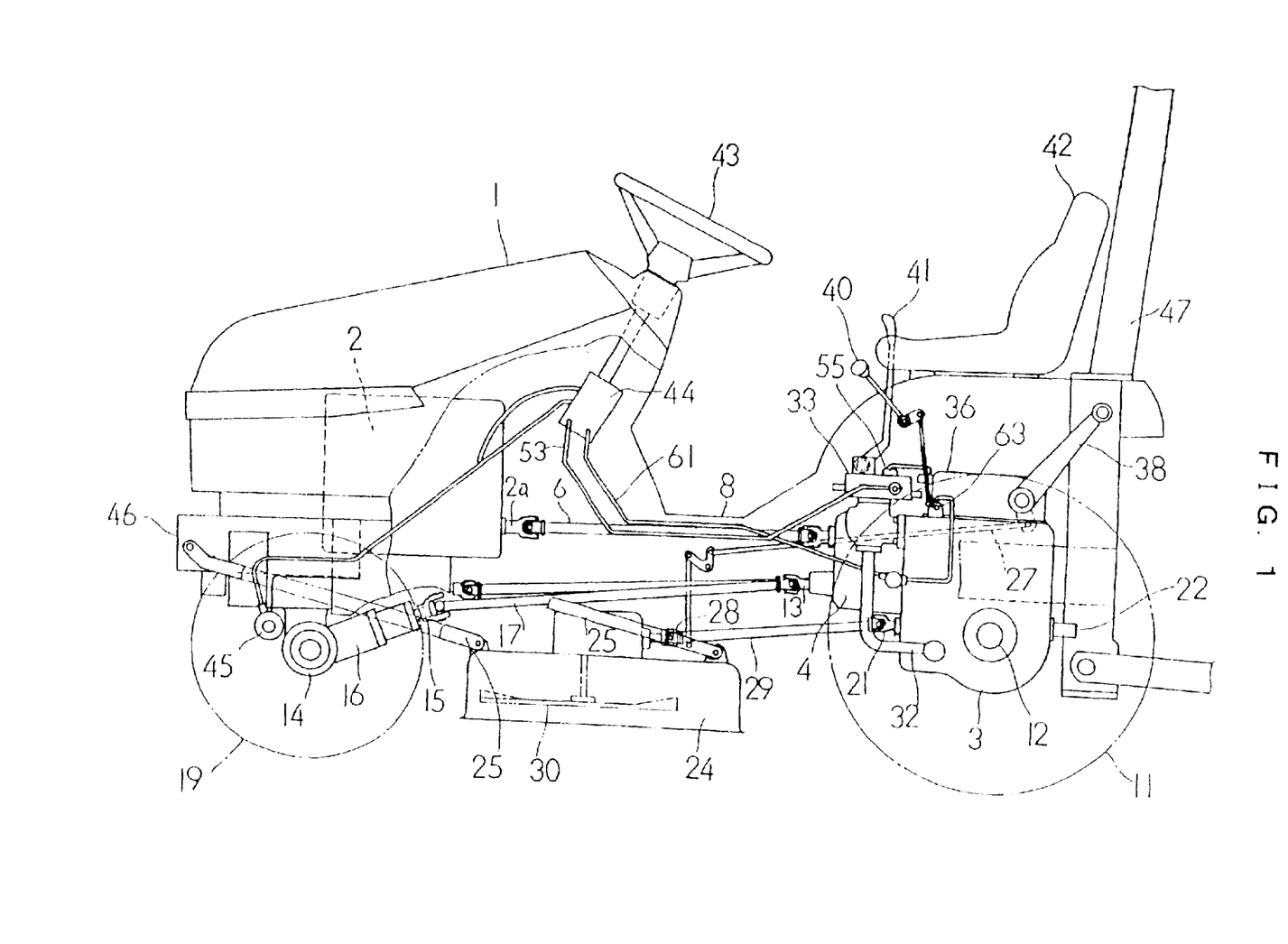
FIG. 1 is a side view of a tractor of an embodiment of the invention.
Figure 2:
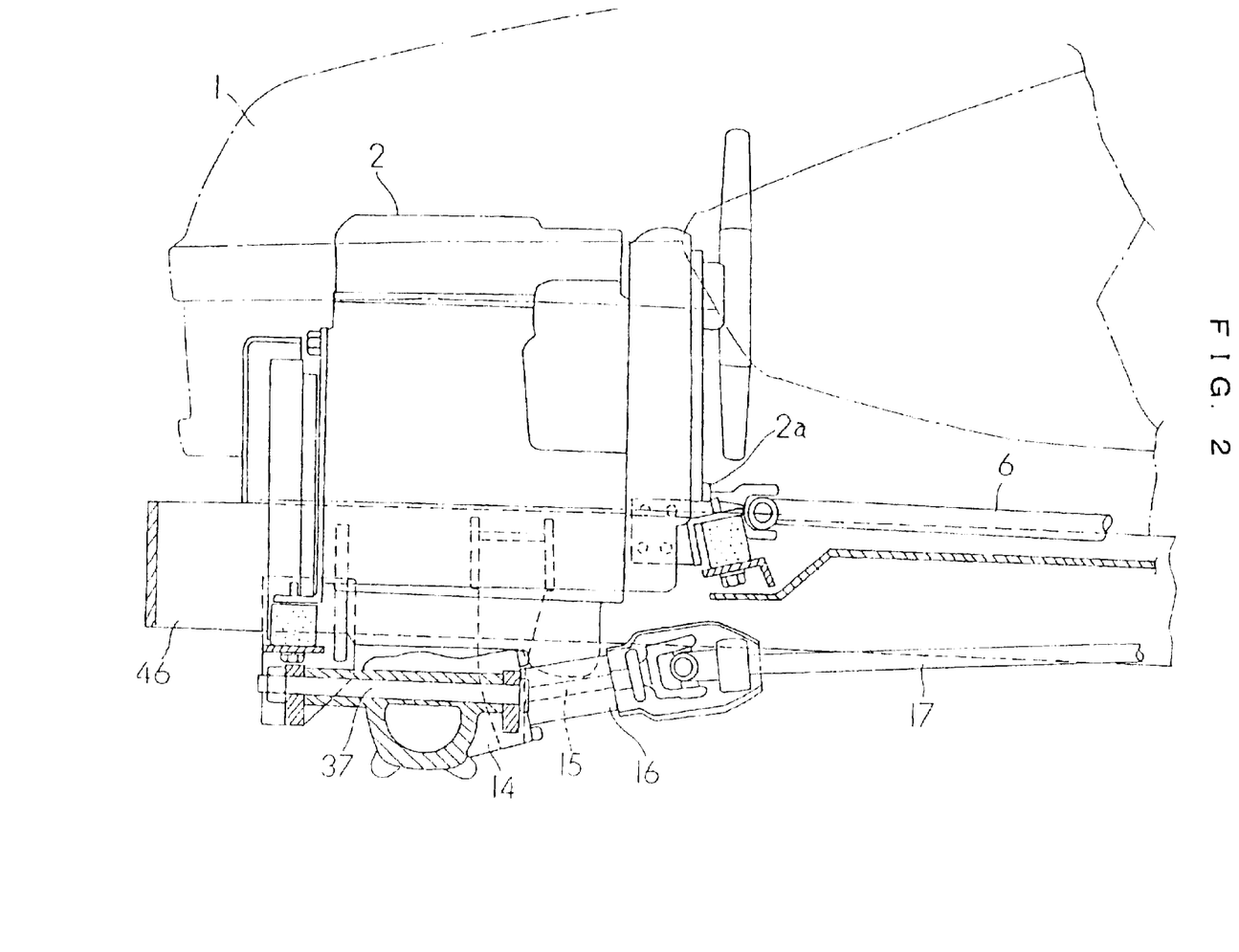
FIG. 2 is an enlarged side sectional view of a main part of the tractor of FIG. 1.
Figure 3:
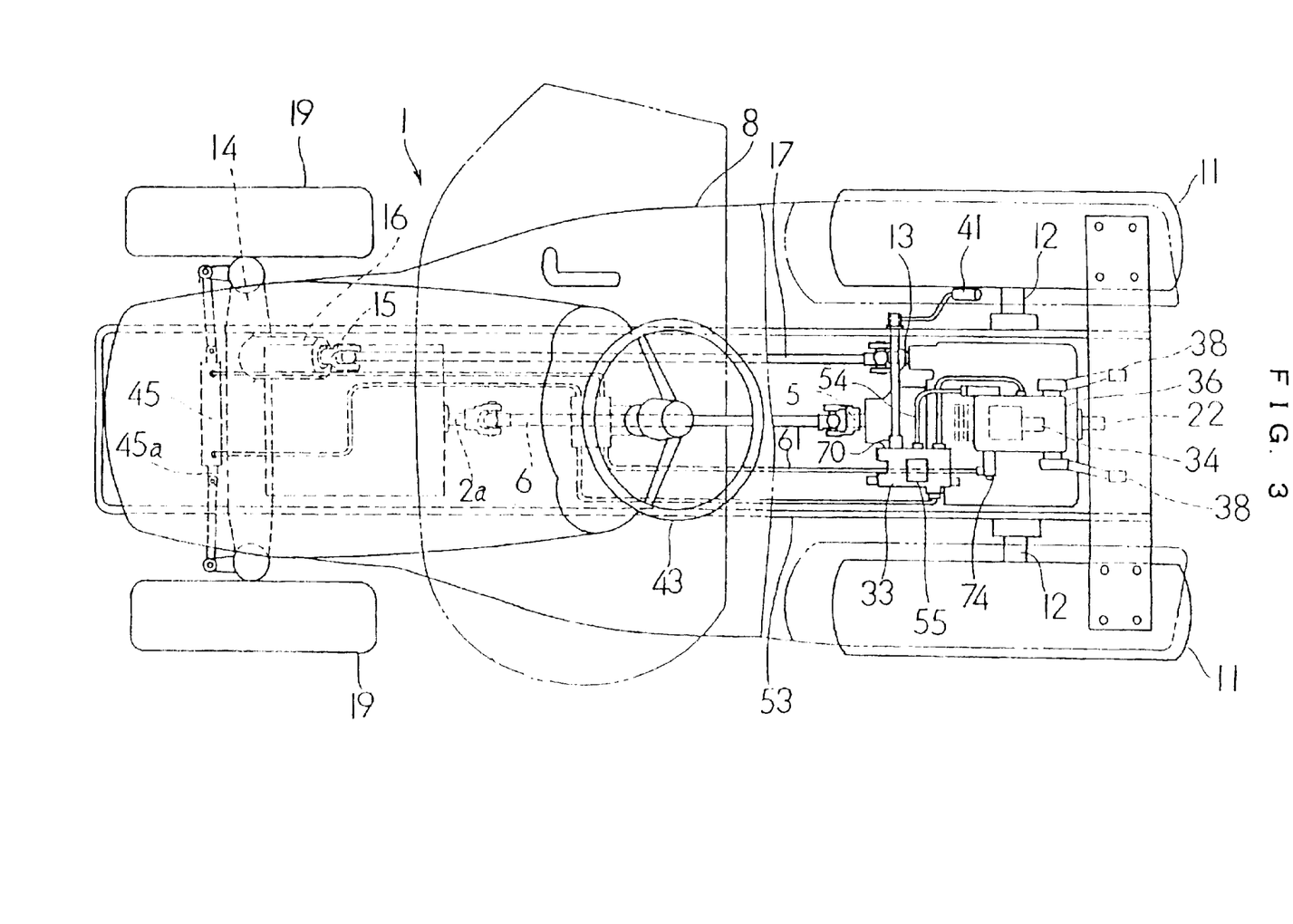
FIG. 3 is a plan view of the tractor of FIG. 1.

Furthermore, the tractor 1 shown in FIG. 1 is provided with an operating lever 40 for turning on and off the PTO clutch, an operating lever 41 for lifting and lowering a work machine, a seat 42, a steering handle 43, a full hydraulic power steering unit 44, and a power steering hydraulic cylinder 45, and a safety frame 47 is provided at the rear portion of a chassis 46 of the tractor 1.

Figure 4:
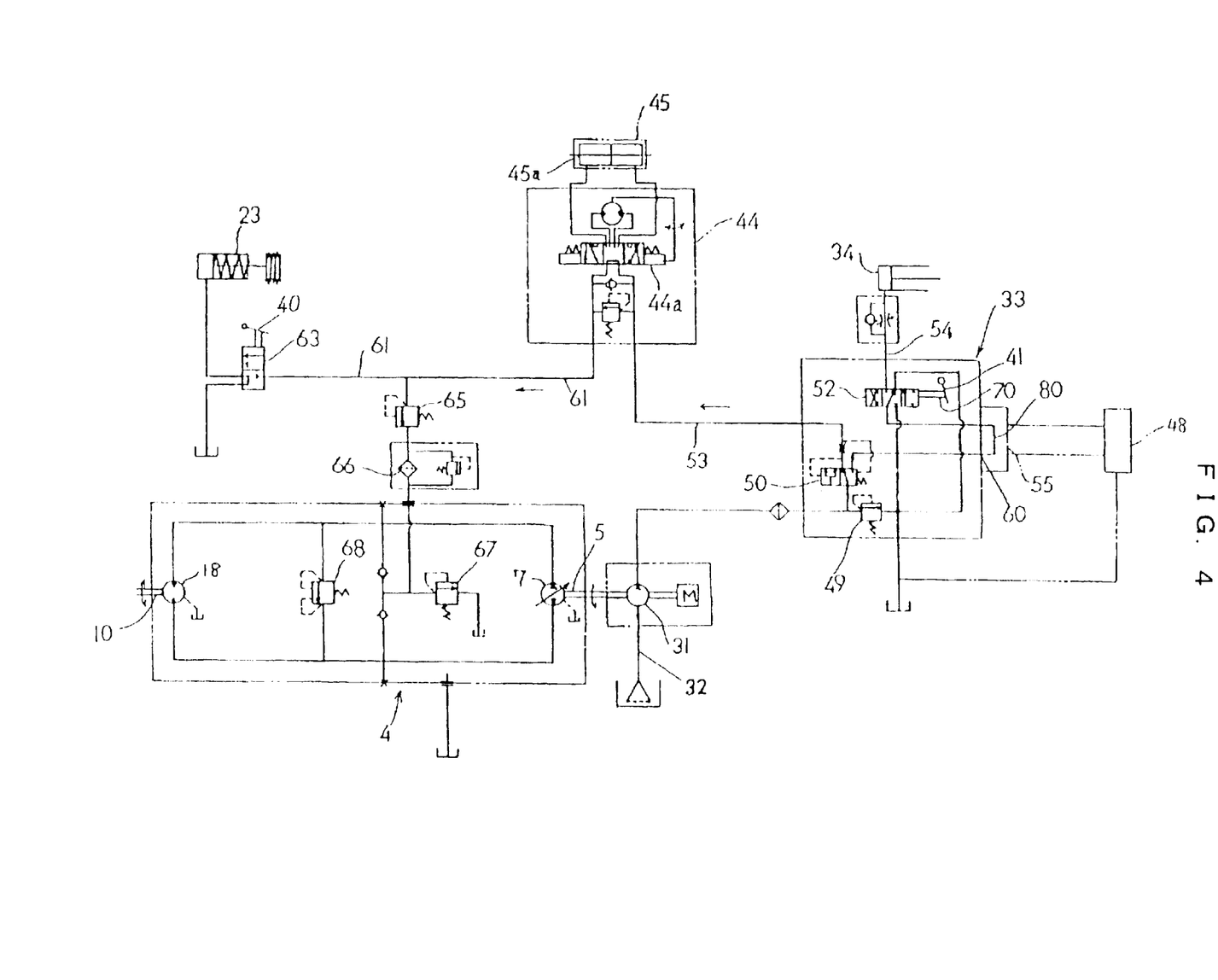
FIG. 4 is a hydraulic circuit diagram of the tractor of FIG. 1.

Next, construction of the entire hydraulic system will be described based on the hydraulic circuit diagram shown in FIG. 4.

A control valve 33 placed at the upper portion of the gear pump 31 is formed by integrally installing a main relief valve 49, a flow dividing valve 50, and a main spool 52 inside, and most of the hydraulic oil is fed to the main spool 52 side of the hydraulic lifting and lowering system by the flow dividing valve 50, and the residual hydraulic oil is fed to the power steering unit 44 side through a piping 53. The main spool 52 is slidably fitted with the control valve 33, and the hydraulic lifting and lowering operating lever 41 is rotated forward and rearward to slide the main spool 52 in the lengthwise direction. For the main spool 52, "lifting position", "neutral position", and "lowering position" are set, and when it is set to the "lifting position", the hydraulic oil is fed into the hydraulic cylinder 34 through a piping 54 to rotate the lift arms 38 to the lifting side.

By attaching a cover member 55 including an oil passage formed inside to the control valve 33, the flow dividing valve 50 side and the main spool 52 side are communicated with each other through the oil passage 80, and when this cover member 55 is removed, an oil passage 60 for external hydraulic discharge is formed, and when external hydraulic equipment such as a valve of a front loader is connected hereto, the external equipment becomes operable.

In the full hydraulic power steering unit 44, the valve 44a is switched by the steering handle 43, the hydraulic oil is fed into the power steering hydraulic cylinder 45, and the piston rod 45a moves laterally to steer the front wheels 19.

The returning side of the power steering unit 44 is connected to the PTO valve 63 via a piping 61, and when this PTO valve 63 switches to on by the PTO operating lever 40, connection to the PTO clutch 23 is made and the mid PTO shaft 21 and the rear PTO shaft 22 rotate. In the present embodiment, by operating a shifter inside the transmission case 3, the mid PTO shaft 21 and the rear PTO shaft 22 can be independently rotated or simultaneously rotated.

The oil passage formed by branching the middle of the piping 61 is connected to the hydrostatic transmission (HST) 4 via a PTO relief valve 65 and a charge filter 66 in this order.

The hydrostatic transmission (HST) 4 is provided with a low pressure relief 67 and a high pressure relief 68. In response to drive of the HST pump 7, the HST motor 18 is driven and the tractor 1 travels.

Figure 5:
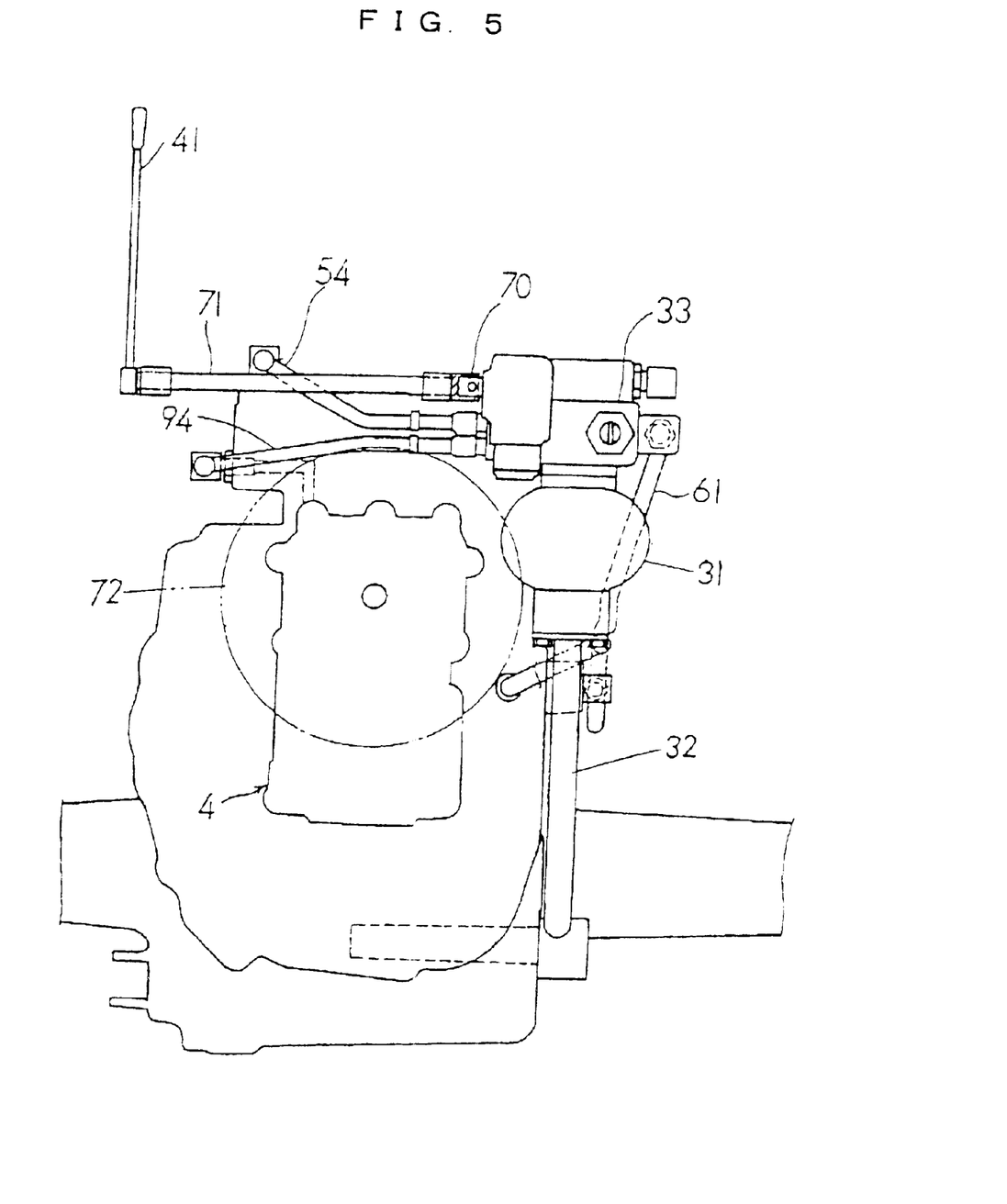
FIG. 5 is an enlarged front view of the main part of the tractor of FIG. 1.
Figure 6:
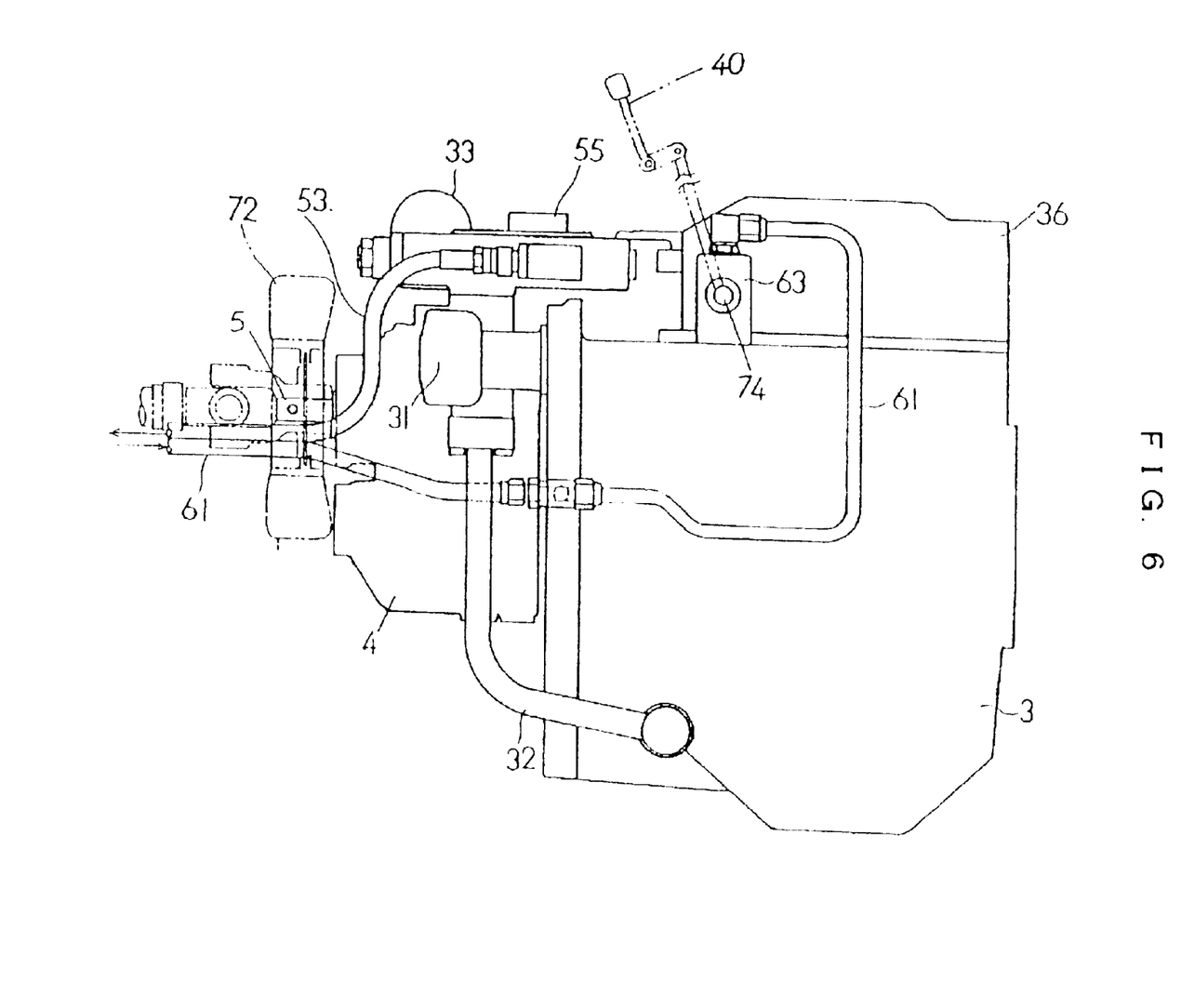
FIG. 6 is an enlarged side view of the main part of the tractor of FIG. 1.
Figure 7:
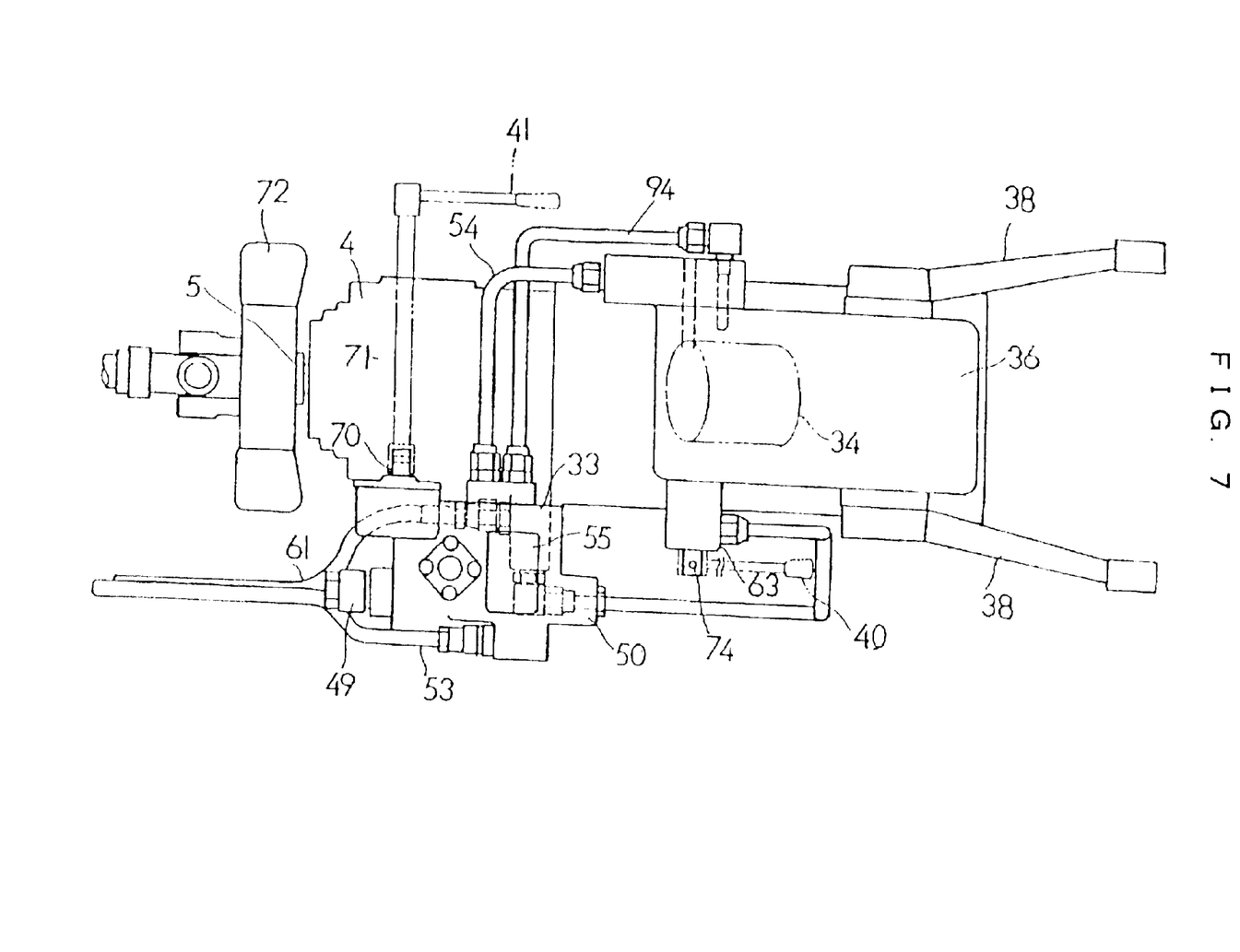
FIG. 7 is an enlarged plan view of the main part of the tractor of FIG. 1.

Next, the constructions of FIG. 5 through FIG. 7 will be briefly described.

FIG. 5 is a drawing of the periphery of the hydrostatic transmission (HST) 4 when being viewed from the front, and at the horizontal inner ends of the control valve 33 positioned below the left side of the seat 42, a rotary shaft 70 for sliding the main spool 52 is projectedly provided horizontally inward, an extending shaft 71 is attached to this rotary shaft 70, and the lower end of the hydraulic lifting and lowering operating lever 41 positioned at the right side of the seat 42 is attached to the end of the extending shaft 71.

Thus, since the extending shaft 71 is attached to the rotary shaft 70 that slides the main spool 52 and a hydraulic lifting and lowering operating lever 41 is directly attached to this extending shaft, in comparison with a system in which a link is interposed as in the prior art, operations become smooth and extra parts becomes unnecessary, and this can suppress manufacturing costs.

FIG. 6 is a drawing showing the hydrostatic transmission (HST) 4 and the transmission case 3 viewed from the side, and FIG. 7 is a plan view of the same, wherein a cooling fan 72 is attached to the front of the pump shaft 5 of the hydrostatic transmission (HST) 4, and during drive of the engine, the main body of the hydrostatic transmission (HST) 4 is cooled by this cooling fan 72. The hydraulic oil at the returning side of the full hydraulic power steering unit 44 reaches the PTO valve 63 through the piping 61, a valve rotary shaft 74 is switched by rotating the PTO operating lever 40, whereby the hydraulic oil is guided to the PTO clutch 23 or discharged to turn the PTO clutch 23 on/off.

Figure 8:
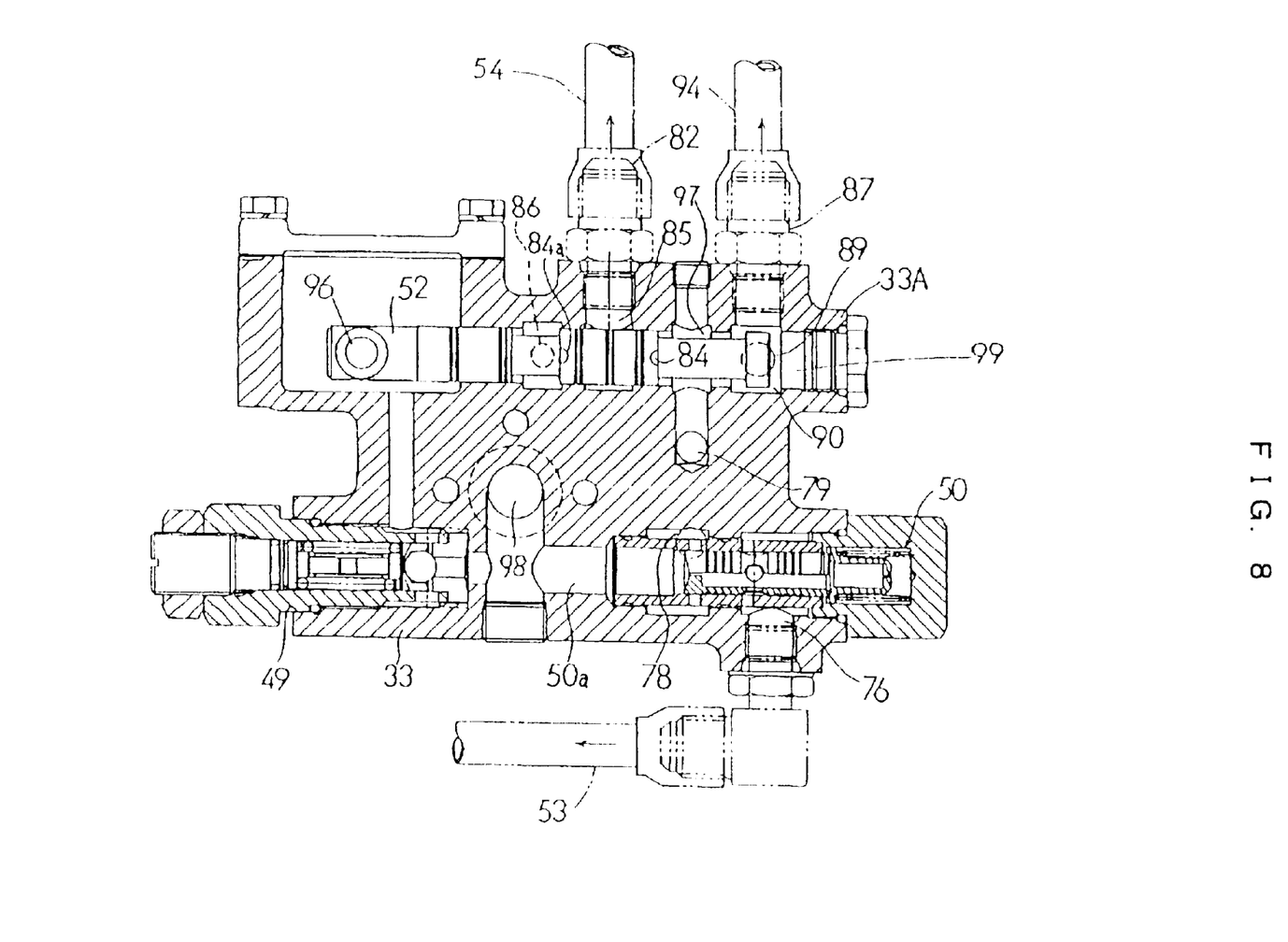
FIG. 8 is a plane sectional view of a control valve of the tractor of FIG. 1.

Next, the construction of the control valve 33 will be described based on FIG. 8 through FIG. 11. FIG. 8 is a plan sectional view of the control valve, and on the left side of the valve body 33A, a main relief valve 49 and a flow dividing valve 50 are provided forward and rearward at a predetermined space. A high-pressure hydraulic oil fed from the gear pump 31 enters a valve chest 50a of the flow dividing valve 50 through a hole 98 made in the valve body 33A, and a part of the hydraulic oil moves toward the full hydraulic power steering unit 44 through the piping 53 from an outlet port 76.

A hole 78 at the flow dividing valve 50 side and a through hole 79 at the main spool 52 side are communicated by an oil passage 80 formed in the cover member 55, and the oil passage is properly switched by sliding of the main spool 52, whereby the hydraulic oil that has entered the main spool 52 flows into the hydraulic cylinder 34 inside the hydraulic cylinder case 36 through the piping 54 from an outlet port 82. Concretely, when the hydraulic lifting and lowering operating lever 41 is turned rearward and the main spool 52 is slid forward (leftward in FIG. 8), a semicircular small opening 84 formed in the main spool 52 is communicated with a chamber 85 at the lifting side, and the hydraulic oil enters the chamber 85 through the opening 84 and flows into the hydraulic cylinder 34 through the outlet port 82.

On the other hand, when the hydraulic operating lever 41 is turned forward and the main spool 52 is moved rearward (rightward in FIG. 8), the hydraulic oil that has flown in the hydraulic cylinder 34 enters the chamber 85 through the same piping 54, passes through the small opening 84a, and returns to the transmission case 3 that is a hydraulic tank.

The hole 86 and the hole 89 of the main spool 52 are always communicated with each other, the hole 89 is communicated with an unloading port 87, and the unloading port 87 is communicated with the transmission case 3 through the piping 94.

Figure 9:
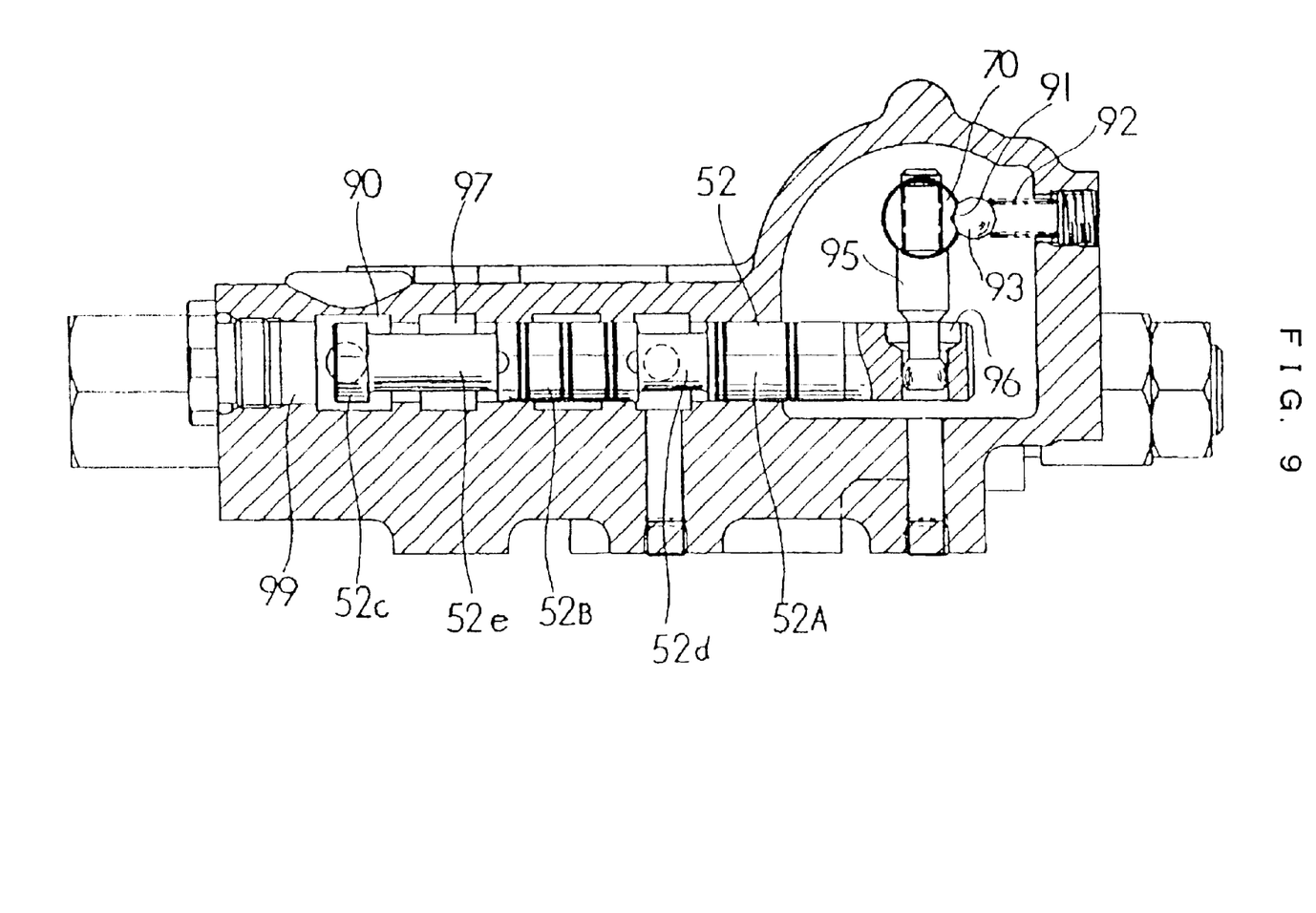
FIG. 9 is a side sectional view of the control valve of the tractor of FIG. 1.
Figure 10:
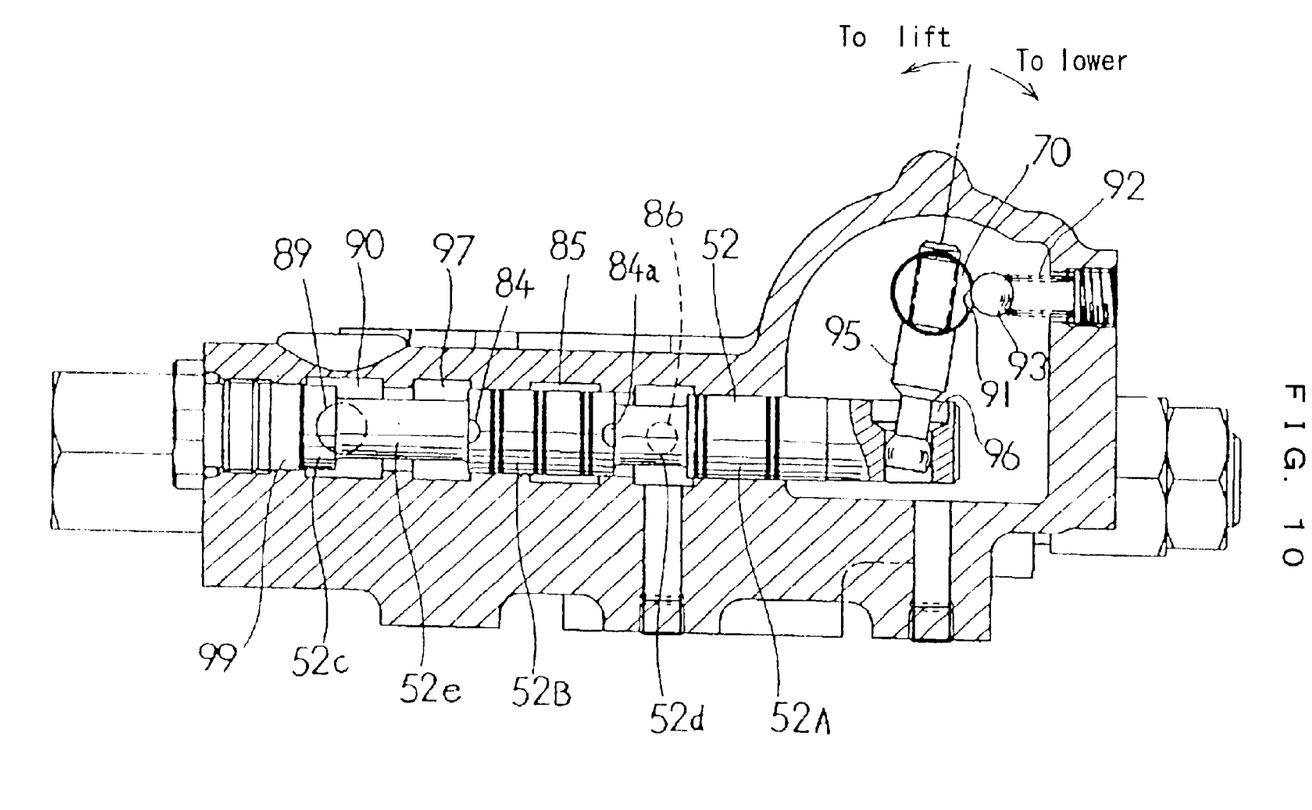
FIG. 10 is a side sectional view of the control valve of the tractor of FIG. 1.
Figure 11:
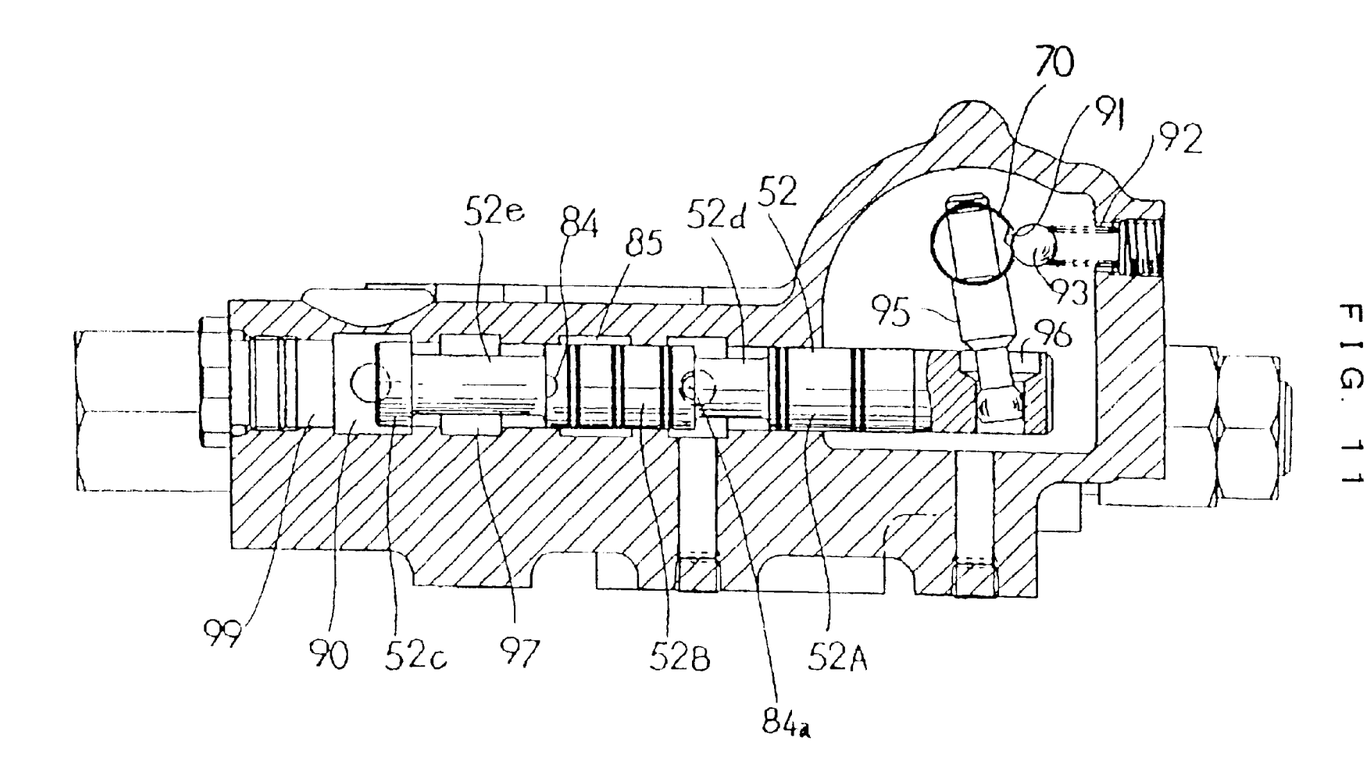
FIG. 11 is a side sectional view of the control valve of the tractor of FIG. 1.

The relationship between the main spool 52 and the control valve 33 will be described in detail with reference to FIG. 9, FIG. 10, and FIG. 11. These figures show the section of the control valve 33 when being viewed from the right side, wherein FIG. 8 is a sectional view when the main spool 52 is at a neutral position, FIG. 9 is a sectional view when the main spool 52 is at a lowering position, and FIG. 11 is a sectional view when the main spool 52 is at a lifting position.

At the front end outer circumference of the rotary shaft 70 which slides the main spool 52 forward and rearward, a positioning notched portion 91 is formed, and a steel-made detent ball 93 pressed by the spring 92 enters this notched portion 91 to hold the neutral condition of the main spool 52.

At the inner end of the rotary shaft 70, a shifter 95 is fixed downward so as to slide the main spool 52, and the lower end of the shifter 95 is fitted into a concavity 96 formed at the upper portion of the main spool 52.

The main spool 52 has three large diameter portions 52A, 52B, and 52C and two small diameter portions 52d and 52e in the lengthwise direction. When the main spool 52 is in the neutral condition, the chamber 97 into which the high-pressure hydraulic oil flows in from the gear pump 31 and the adjacent chamber 90 are communicated with each other, whereby the hydraulic oil flows into the chamber 90 side from the chamber 97, and the condition changes into a so-called unload condition where all of the hydraulic oil flows enters the transmission case 3. At the rear side of the chamber 90, a damper chamber 99 that is communicated with this chamber 90 and has an inner diameter slightly larger than that of the large diameter portion 52C of the main spool 52 is formed.

This damper chamber 99 applies a resistance at the moment the large diameter portion 52C of the main spool 52 slips into the damper chamber 99 when the hydraulic operating lever 41 is pushed down to slide the main spool 52 rearward (leftward in FIG. 10), whereby a load change is conveyed to an operator who operates the hydraulic lifting and lowering operating lever 41, and it is possible to make the operator recognize that this pushing-down operation effectively acts.

When the hydraulic operating lever 41 is operated to the lowering side, the hydraulic oil inside the hydraulic cylinder 34 returns to the inside of the transmission case 3 through the piping 54, the chamber 85, the opening, 84a, the holes 86 and 89, the port 87, and the piping 94 in order.

On the other hand, when the hydraulic operating lever 41 is operated to the lifting side, the main spool 52 moves forward (rightward in FIG. 11), and the large diameter portion 52C at the rear end of the main spool 52 intercepts the communication between the chambers 90 and 97. Then, the high-pressure hydraulic oil from the gear pump 31 enters the inside of the chamber 85 through the opening 84 and flows into the hydraulic cylinder 34 through the outlet port 82 and the piping 83 to lift the lift arms 38.

According to the first aspect of the invention, a sufficient work machine lifting and lowering space can be secured between the front wheels 19 and rear wheels 11, and a work machine mounted to the lower portion of the traveling vehicle body can be lifted high from the ground, whereby movements of the traveling vehicle body can be made easier.

Furthermore, the second universal joint 17 for driving the front wheels 19 is constructed so that the middle portion is not supported on the vehicle body via a bearing but is directly joined to the front wheel traveling input shaft 15 that is provided so as to project rearward to the inclined upper side, so that the second universal joint 17 can also be provided at a high position from the ground, a work machine lifting and lowering space can be sufficiently secured, the construction becomes simpler, and the number of parts is reduced, whereby manufacturing at low cost is realized.

Particularly, as in the second aspect of the invention, when a mower is mounted as a work machine, there is no possibility that a gear box and the like for driving the mower blades come into contact with the second universal joint 17, so that the tractor can travel by lifting the mower high.

Moreover, according to the third aspect of the invention, a rotating drive force of the engine 2 is smoothly transmitted to a driving force transmitting part at the transmission case 3 side without hindrance, and driving force transmission to the front wheels 19 is reliably achieved by the second universal joint 17 passing a high position from the ground, and therefore, when a work machine is mounted between the front and rear wheels 19 and 11, the machine can be lifted high without any problem.

According to the fourth aspect of the invention, the control valve 33 is constructed so as to include the work machine lifting and lowering main spool 52 and the flow dividing valve 50 for feeding a part of the hydraulic oil to the work machine lifting and lowering hydraulic cylinder 34 and feeding the residual oil to other hydraulic equipment 44, which are integrally installed, and this control valve 33 is attached to the upper portion of the gear pump 31 that is driven by a driving force from the transmission case 3, and the hydraulic operating lever 41 for operating the main spool 52 is attached to the shaft 70 projecting horizontally sideward from the control valve 33, so that switching of the valve 33 is smoothly carried out, and since the control valve 33 and the gear pump 31 can be joined to each other without using a piping, reliable operations while pressure breakage is prevented can be expected. In addition, since the control valve 33 and the gear pump 31 are collectively provided above the transmission case 3, assembly and disassembly can be easily carried out.

Furthermore, according to the fifth aspect of the invention, since an external hydraulic extracting port 60 is formed in the side surface of the control valve 33, the front loader and other work machines can be hydraulically driven.

Furthermore, according to the sixth aspect of the invention, a damper chamber 99 is provided between the end at the lowering position side of the main spool 52 and the control valve body 33A side to provide a damper effect in the minute lowering region for starting lowering of the work machine, so that movements of the hydraulic operating lever 41 for operating the main spool 52 when starting a lowering operation can be made smooth, and for example, fine adjustments in tilling depth of a rotary cultivator can be easily made.

What is claimed is:

1. A tractor comprising:

a traveling vehicle body having a pair of front wheels 19 and a pair of rear wheels 11;

an engine 2 that is mounted at the front portion of said traveling vehicle body and has an output shaft 2a;

a transmission case 3 that is disposed at the rear portion of the traveling vehicle body and houses a transmission including an input shaft 5 and a front wheel driving shaft 13;

a first universal joint 6 joining the output shaft 2a of the engine 2 and the input shaft 5 of the transmission case 3;

a work machine 24 loaded between the front wheels 19 and the rear wheels 11 in a manner enabling it to rise and fall;

a front axle housing 14 supporting the pair of front wheels 19;

a front wheel traveling input shaft 15 provided so as to project upward to the horizontal direction at the rear portion of the front axle housing 14; and a second universal joint 17 joining the front wheel traveling input shaft 15 and the front wheel driving shaft 13 projecting from the transmission case 3.

2. The tractor according to claim 1, wherein the work machine 24 is a mower that is used for mowing.

3. The tractor according to claim 1, wherein, in a planar view, the first universal joint 6 is provided at the horizontal center of the traveling vehicle body, and the second universal joint 17 is provided so as to deflect horizontally with respect to this first universal joint 6, and when being viewed from the side, the first universal joint 6 is provided higher than the second universal joint 17.

4. A tractor comprising:

a traveling vehicle body having a pair of front wheels 19 and a pair of rear wheels 11;

an engine 2 that is mounted at the front portion of said traveling vehicle body and has an output shaft 2a;

a work machine loaded in the traveling vehicle body having front wheels 19 and rear wheels 11 and other hydraulic equipment 44 that operates by other hydraulic pressure;

a gear pump 31 for generating a hydraulic pressure so that said work machine and other hydraulic equipment 44 are operated by a driving force from the engine 2;

a hydraulic cylinder 34 for lifting and lowering the work machine by hydraulic oil from the gear pump 31;

a control valve 33 located adjacent to the upper portion of the gear pump 31 in a vertical direction to the vehicle body in which a first oil passage for feeding hydraulic oil obtained by said gear pump 31 to the hydraulic cylinder 34, a main spool 52, having a diameter, for controlling open and close of this first oil passage, a second oil passage for feeding the hydraulic oil to other hydraulic equipment 44, a third oil passage for feeding the hydraulic oil to the first and second oil passages from the gear pump 31, and a flow dividing valve 50 provided at a point of divergence for the first, second, and third oil passages are integrally installed;

a shaft 70 provided so as to project horizontally sideward from this control valve 33; and a hydraulic operating lever 41 which is attached to this shaft 70 and operates the main spool 52.

5. The tractor according to claim 4, wherein an external hydraulic extracting port 60 for a front end loader and other work machines is formed in the side surface of the control valve 33.

6. The tractor according to claim 4, wherein the control valve 33 is provided so as to include a control valve body 33A as a component, three positions, that is, a lifting position, a neutral position, and a lowering position of the work machine are set by sliding the main spool 52 inside this control valve body 33A in the lengthwise direction of the main spool 52, and a damper chamber 99 having an inner diameter slightly large than that of the diameter of the main spool 52 is provided between the end of the main spool 52 when it is at the lowering position and the control valve body 33A side.

7. The tractor according to claim 2, wherein, in a planar view, the first universal joint 6 is provided at the horizontal center of the traveling vehicle body, and the second universal joint 17 is provided so as to deflect horizontally with respect to this first universal joint 6, and when being viewed from the side, the first universal joint 6 is provided higher than the second universal joint 17.

8. The tractor according to claim 5, wherein the control valve 33 is provided so as to include a control valve body 33A as a component, three positions, that is, a lifting position, a neutral position, and a lowering position of the work machine are set by sliding the main spool 52 inside this control valve body 33A in the lengthwise direction of the main spool 52, and a damper chamber 99 having an inner diameter slightly large than that of the diameter of the main spool 52 is provided between the end of the main spool 52 when it is at the lowering position and the control valve body 33A side.

* * * * *